Patented Jan. 28, 1941

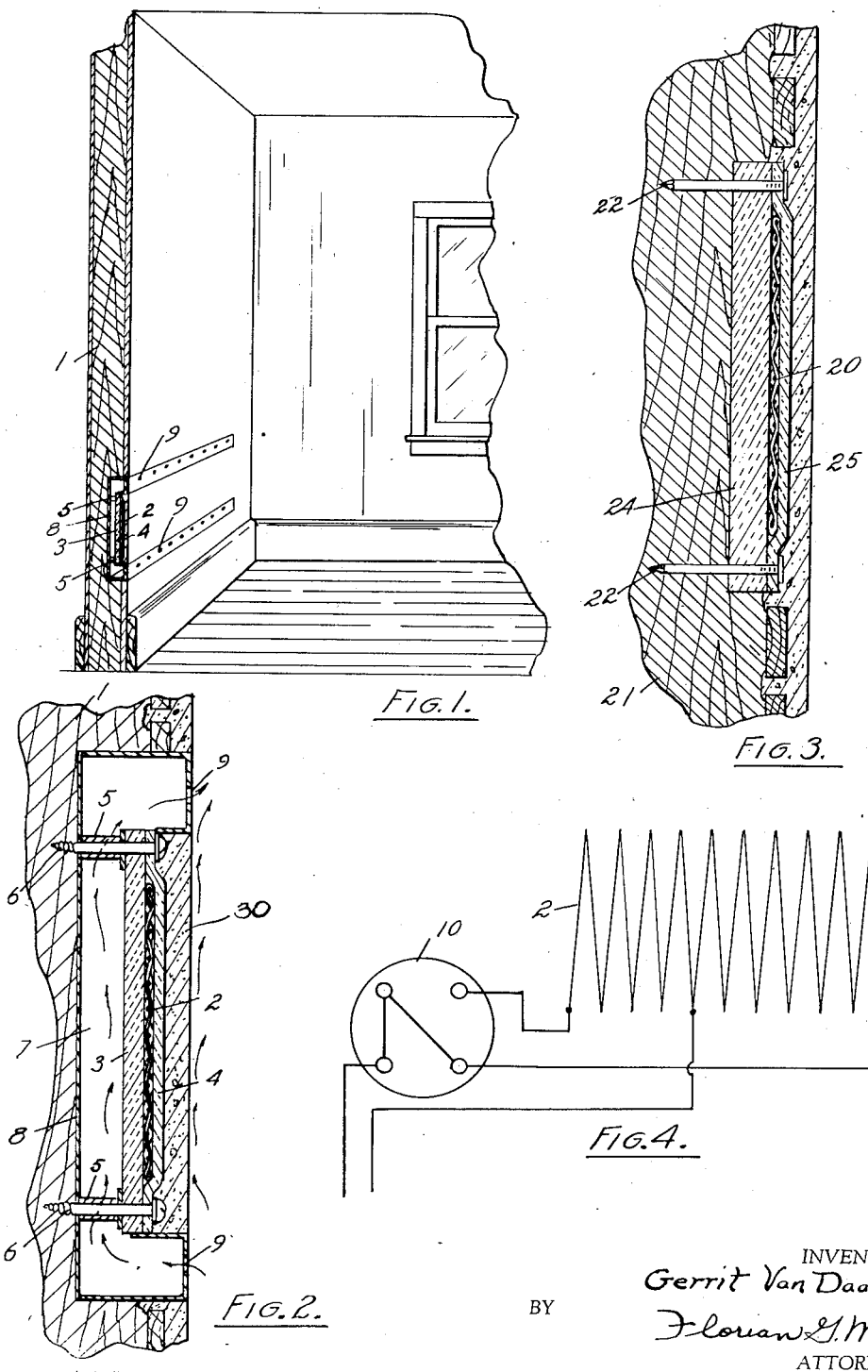

2,230,095

UNITED STATES PATENT OFFICE 2,230,095

WALL HEATER

Gerrit Van Daam, Buffalo, N. Y.

Application May 3, 1939, Serial No. 271,547

4 Claims. (Cl. 219—34)

This invention relates generally to electric heaters and more particularly to electric wall heaters.

Devices of this connection made according to the prior art and with which I am familiar have not been practical for the heating of enclosed areas such as rooms, cabins of planes, and the like, because it has been impossible to obtain the proper transfer of heat and likewise the proper circulation thereof in the enclosed area. Electrical resistance heaters using the principal of radiation have been used without much success. These have been found very inefficient and impractical because of the lack of circulation of the heat. Limitations in manufacturing heating elements heretofore made it impossible to use electric heaters which covered extensive areas of the wall surface. These prior heaters collected dirt and had no provisions for the natural circulation of air around the heater as provided by the applicant's heater. Prior heaters likewise had no means of maintaining or storing the heat for any length of time as the heating element was switched off. Prior heaters also provided fire hazards.

It is accordingly an object of my invention to overcome the above and other defects in wall heaters and it is more particularly an object of my invention to provide an electric wall heater which is efficient in operation, ornamental in design, cheap in cost and easy to install.

Another object of my invention is to provide a wall heater which may extend the entire length or width of the room in which it is installed.

Another object of my invention is to provide an electric wall heater which utilizes no part of the space of the room.

Another object of my invention is to provide an electric wall heater which has a maximum heating effect on the air in the room to be heated.

Another object of my invention is to provide an efficient heating element for the cabin of airplanes.

Another object of my invention is to provide an electric wall heater which has a low wattage density to avoid the danger of fire and explosion.

Another object of my invention is to provide a heating element for an electric wall heater which provides maximum heating for minimum area utilized.

Another object of my invention is to provide a wall heater which has provisions for changing the temperature of the heater.

Another object of my invention is to provide a low density electric heater covering a large area with ventilating means for maximum circulation of heat in the room.

Another object of my invention is to provide a resistance element embedded in glass.

Another object of my invention is to provide glass yarn insulated wire for electric wall heaters embedded in plaster or glass.

Other objects of my invention will become evident in the following detailed description taken in conjunction with the accompanying drawing in which:

Fig. 1 is a fragmentary perspective view of a room showing one wall thereof in cross section with my novel electric wall heater assembled therein.

Fig. 2 is an enlarged cross-sectional view of my novel wall heater shown in Fig. 1.

Fig. 3 is a modified form of wall heater in which the heating element is embedded in the wall; and Fig. 4 is a diagrammatic view of the wiring system.

Referring to the drawing, Fig. 1 shows a wall 1 having my novel electric heater disposed therein, the heater being disposed lengthwise of the wall as shown in Fig. 1. The heater comprises a woven heating element 2 disposed between non-conducting members 3 and 4. The non-conducting members 3 and 4 may be made of any suitable materials such as asbestos sheets. The heating element 2 is secured to the wall portion by spacers 5 and screw members 6. A channel 7 for the circulation of air is provided by the spacers 5 and the sheet metal channel member 8. Apertures 9 permit the natural circulation of air in the channel 7 thereby providing for a maximum transfer of heat from the heating element 2 to the air of the room. The front of the heating element has plaster or base-board 30 secured thereto to provide for the storage of heat when the three-way switch 10 in Fig. 4 is turned to an off position. Switch 10 provides means for adjusting the temperature of the heating element 2 and three different temperatures. It will be apparent that means may be provided for any number of adjustments of the temperature of the heating element 2. The face of the plaster or base board 30 lies in the vertical plane of the wall of the room thereby making the appearance of the electric heater ornamental as well as practical. Applicant's heater may be used for heating the cabin of a plane or any other enclosed area. Applicants heater is very efficient for use in heating cabins of planes because it is fire and explosive proof, requires no space, is very light in weight and requires very little wattage. Because of the area of heating surface utilized, applicant uses very low wattage because it is not necessary to bring the heating element 2 to a very high temperature in order to heat the room.

Another form of heating element is shown in Fig. 3 in which the heating element is embedded in the wall of a room. In this form the electric wall heater is invisible. Heating element 20 is secured to the wall 21 by nails 22 or any other suitable means. The heating element 20 is disposed between the non-conducting members 24 and 25 and base-board or plaster 26 is secured to the outer side of the heating element 20. The face of the base-board or plaster 26 blends in with the wall surface of the room to make the heating element 20 invisible. This type of heater stores heat for a long period of time so that when the element 20 is switched off at night the wall retains the heat for several hours before it is dissipated by transfer to the air of the room.

The resistance wire of the heating elements are preferably glass yarn insulated wire. These may be moulded directly in plaster or glass may be used. Glass has been found to be very suitable for embedding resistance wire.

It will be apparent that I have provided an electric wall heater which is efficient in operation, light in weight, cheap in cost, invisible and easy to install, fireproof and explosion proof.

Various changes may be made in the specific embodiment of the present invention without departing from the spirit thereof or from the scope of the appended claims.

What I claim is:

1. An electric wall heater comprising a woven electric resistance element of substantial area, non-conducting members disposed on both sides of said element, and a member for the storage of heat on the side of said non-conducting members in a plane with the wall in which said wall heater is disposed.

2. An electric heater as set forth in claim 1 wherein means are provided for forming a ventilating channel around said rear non-conducting member.

3. An electric wall heater comprising a woven resistance element of substantial area with low wattage density, non-conducting members disposed on the front and rear portions of said resistance element, and a member for storing heat which blends into the wall into which the heater is disposed.

4. An electric heater as set forth in claim 3 wherein a ventilating means around the wall heater is provided.

GERRIT VAN DAAM.